(12) United States Patent
Wieclawski

(10) Patent No.: US 6,273,511 B1
(45) Date of Patent: Aug. 14, 2001

(54) SEAT AND HEADREST ARRANGEMENT FOR A VEHICLE

(75) Inventor: Stanislaw Andrzej Wieclawski, Gross-Gerau (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/338,210

(22) Filed: Jun. 22, 1999

(30) Foreign Application Priority Data

Jun. 22, 1998 (DE) .......................................... 298 11 127 U

(51) Int. Cl.$^7$ ...................................................... B60N 2/24
(52) U.S. Cl. .................. 297/463.1; 297/216.12; 297/216.13; 297/354.11
(58) Field of Search ................................ 297/463.1, 353, 297/358, 354.1, 369, 378.14, 391, 396, 410, 216.1, 216.11, 216.12, 216.13, 216.17, 354.11

(56) References Cited

U.S. PATENT DOCUMENTS

| | | | |
|---|---|---|---|
| 3,494,663 | * | 2/1970 | Flint .................................. 297/354.1 |
| 4,353,594 | * | 10/1982 | Lowe .......................... 297/362.13 X |
| 4,655,471 | * | 4/1987 | Peek ................................. 297/358 X |
| 5,181,762 | * | 1/1993 | Beumer ............................... 297/358 |
| 5,531,503 | * | 7/1996 | Hughes .......................... 297/463.1 X |
| 5,671,972 | * | 9/1997 | Tedesco .......................... 297/362.13 |
| 6,213,549 | * | 4/2001 | Wieclawski ................. 297/216.12 X |

* cited by examiner

Primary Examiner—Peter R. Brown
Assistant Examiner—Stephen Vu
(74) Attorney, Agent, or Firm—Brooks & Kushman P.C.

(57) ABSTRACT

A seat and headrest arrangement for a vehicle has a backrest frame (10) having an upper (12) and a lower part (14) which are connected to one another via a joint (16), with a headrest (20) being mounted at the upper part (12). A setting device (24) adjusts the inclination of the upper part (12) dependent upon the inclination of the lower part (14).

11 Claims, 3 Drawing Sheets

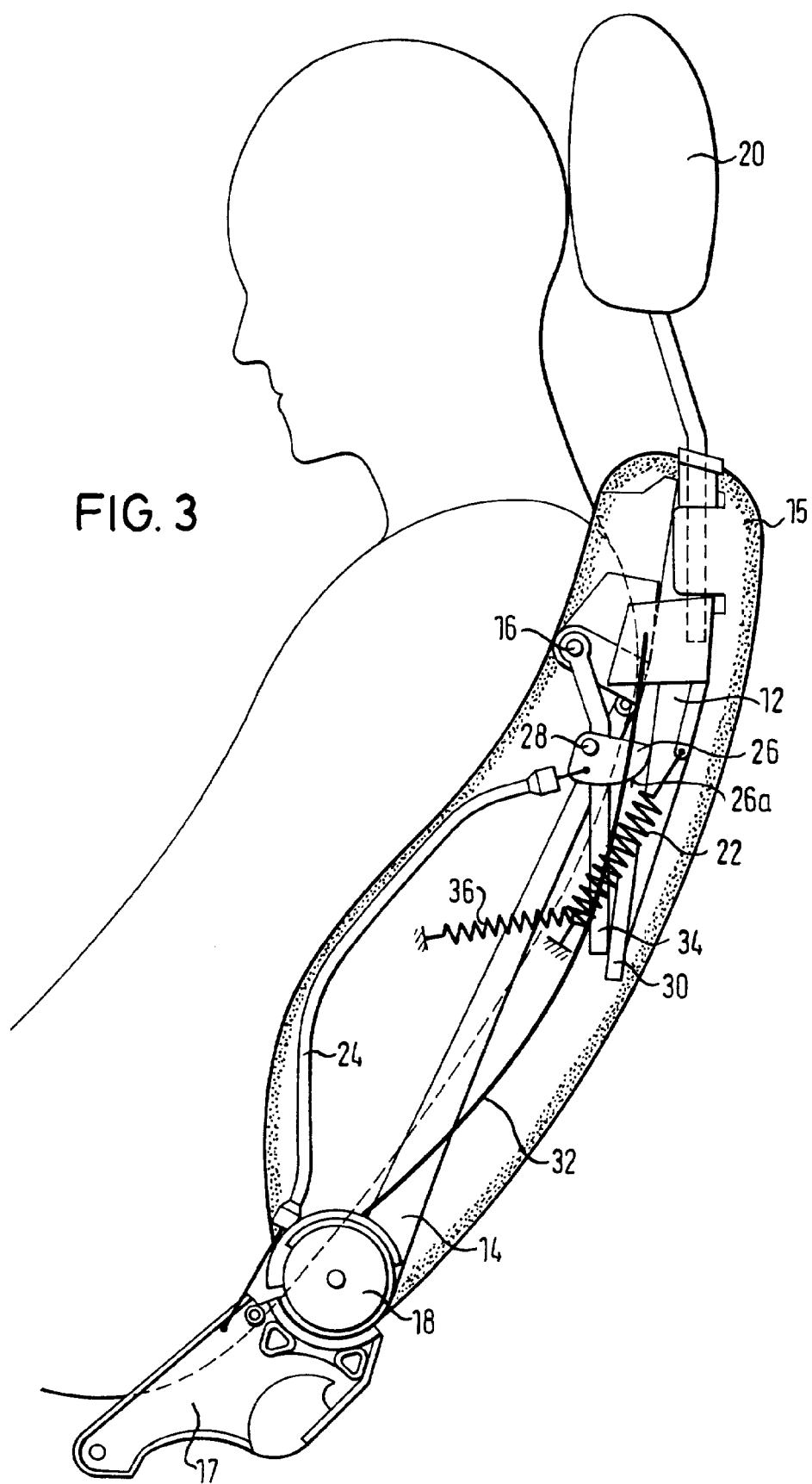

SEAT AND HEADREST ARRANGEMENT FOR A VEHICLE

FIELD OF THE INVENTION

The invention relates to a seat and headrest arrangement for a vehicle comprising a backrest frame having an upper and a lower part which are connected to one another via a joint, with a headrest being mounted at the upper part (cf. DE 197 43 339).

DESCRIPTION OF THE RELATED ART

Conventional vehicle seats usually consist of a seat frame and a backrest frame which is pivotally connected thereto and which can be adjusted in its inclination with respect to the seat frame in order to enable an adaptation to the anatomy and to the individual requirements of the vehicle passengers. In these conventional arrangements there exists the basic problem that the distance between the head of the vehicle passenger and the headrest which is mounted on the backrest frame varies in dependence on the inclination of the backrest frame. Therefore the distance between the back of the head of a vehicle passenger and the headrest can be determined in conventional vehicle seats for one theoretical seat position only. This however represents a compromise between safety and comfort since the theoretically safest position with a completely upright backrest is uncomfortable and the most comfortable seat position with a completely inclined backrest offers the least protection, since the distance between the headrest and the back of the head of the vehicle passenger is a maximum in this case.

SUMMARY OF THE INVENTION

The object of the present invention is to provide a seat and headrest arrangement of the initially named kind in which a risk of injury to the neck and cervix region of a vehicle passenger is minimised.

This object is satisfied by the features of claim 1 and in particular in that a setting device is provided which adjusts the inclination of the upper part in dependence on the inclination of the lower part.

In accordance with the invention the setting device automatically produces an adjustment of the upper part, at which the headrest is fastened, when the lower part is adjusted, through which the distance between the back of the head of the vehicle passenger and the headrest, which increases as the inclination of the backrest increases, can be compensated through a contrary movement of the upper part. Through this a system is provided through which a constant distance remains between the head of the vehicle passenger and the headrest independently of the inclination of the backrest so that the ideal distance can always be maintained between the head and the backrest even when the backrest is set at different inclinations.

Advantageous embodiments of the invention are described in the description, in the drawings and in the subordinate claims.

In accordance with a first advantageous embodiment the setting device is fastened with one end at a carrier of the seat or at an inclination adjustment of the lower part. Through this it is effected that the setting device is simultaneously and automatically actuated through an inclination adjustment of the backrest frame, which in the one case takes place through a relative movement between the seat carrier and the backrest frame and in the other case through the movement of the inclination adjustment. An inclination adjustment of this kind can be formed by a hand wheel or by an electric motor.

In accordance with a further embodiment of the invention the setting device acts on a cam which is articulatedly arranged at the lower part of the backrest frame, with the upper part abutting at the cam. In this embodiment a mechanical adjustment of the upper part takes place with respect to the lower part through the pivoting of the cam, which is actuated by the setting device.

It is particularly advantageous when the upper and the lower part are subjected to a bias force with respect to one another and when the cam curve is formed in such a manner that the force which is exerted by the upper part on the cam passes substantially in the direction of the pivot axis of the cam. In this embodiment it is ensured that no excessive forces are exerted on the setting device when the head of the vehicle passenger is pressed with a large force against the headrest. In this case the force which is exerted by the upper part on the cam—independently of the inclination of the cam—always acts substantially in the direction of the pivot axis, which can take up this force. Through this the forces acting on the setting device are reduced. At the same time it is excluded that the vehicle passenger involuntarily influences the position of the upper part with his head, since the cam is always in a blocking position in which no or only a slight force can be exerted via the cam on the setting device.

In accordance with a further advantageous embodiment of the invention an impact means is provided at the upper part which preferably extends in the direction of the lower part. Through this in the event of an accident the back of the vehicle passenger, which dips into the backrest frame, can exert a force on the impact element so that the upper part is pivoted about the joint in order thereby to bring the headrest closer to the back of the head of the vehicle passenger. Alternatively or additionally an impact means, preferably a mat, which extends along the lower part can be provided at the lower part. A mat of this kind is stretched inside the backrest frame and additionally reduces the impact of the back of the vehicle passenger.

It is particularly advantageous when a pivot element which is pivotally connected at the lower part and which cooperates with the impact element of the upper part is associated with the impact means of the lower part, for example the mat. Through this it is provided for that a definite force is exerted on the impact element of the upper part in that the pivot element is incident on the impact element of the upper part.

BRIEF DESCRIPTION OF THE DRAWINGS

In the following the invention will be described in a purely exemplary manner with reference to advantageous embodiments and with reference to the accompanying drawings. Shown are FIG. 1 a partially sectioned side view of a first embodiment, with both the vehicle passenger and the backrest being illustrated in two different seat positions;

FIG. 3 a side view of the embodiment of FIG. 2, with the vehicle passenger being strongly pressed into the seat as a result of a rear collision.

DETAILED DESCRIPTION OF THE INVENTION

Figure 1:
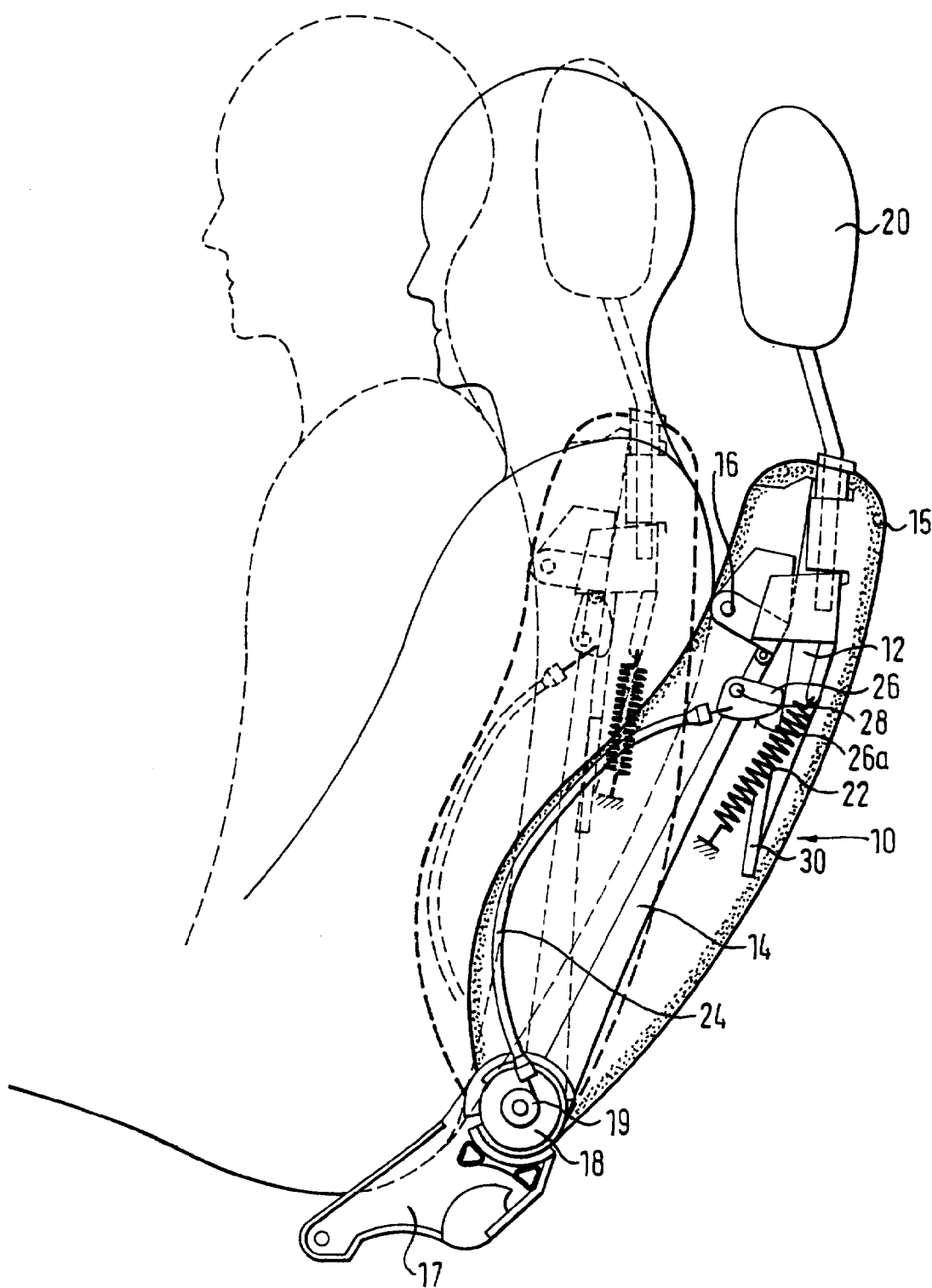

FIG. 1 shows in a highly simplified illustration the side view of a seat and headrest arrangement in accordance with the invention for a vehicle, having a backrest frame 10 which consists of an upper part 12 and a lower part 14 which are articulatedly connected to one another via a joint 16 with a horizontal axis. Both the upper part 12 and the lower part 14 are designed as a frame and are provided with a cushioning 15. The lower part 14 is rotatably connected in the conventional manner to a seat frame element 17 and can be pivoted with respect to the latter via a hand wheel 18 which effects an adjustment of the backrest frame 10 relative to the seat frame element 17 via a transmission 19.

As shown in FIG. 1 the backrest frame 10 is designed as a divided frame, with the joint 16 which connects the upper part 12 and the lower part 14 pivotally to one another being provided in the region of the division. In this the lower part 14 extends over approximately 60% and the upper part 12 extends over approximately 40% of the total height of the backrest frame 10. The joint 16 is located on that side of the backrest frame 10 which faces the vehicle passenger so that the upper part 12 can be pivoted through an angle with respect to the lower part, as is illustrated in FIG. 1. At the same time the headrest 20, which is secured to the upper part 12 via two bars and which is mounted in the conventional manner, i.e. adjustable in height and inclination, is therein pivoted along with it.

A spring 22, which is arranged between the lower part 14 and the upper part 12, biases the upper part 12 in the direction of the lower part 14.

For the adjustment of the inclination of the upper part 12 a setting device is provided in the form of a Bowden cable 24, of which the guide sleeve is fastened at both ends to the lower part 14. The one end of the draw cable of the Bowden cable 24 is connected to the transmission 19 which adjusts the inclination of the backrest frame 10. The other end of the draw cable is fastened at a cam 26 which is fastened via a joint 28 at the lower part 14, with the axis of the joint 28 extending parallel to the axis of the joint 16. As can be recognised, one region of the upper part 12 lies in contact at the cam curve 26a of the cam 26 since the spring 22 exerts a bias force on the upper part 12 in the direction of the lower part 14.

Through the illustrated design it is possible to adjust the draw cable of the Bowden cable 24 through an adjustment of the inclination of the backrest frame 10 by means of an actuation of the hand wheel 18 so that the cam 26 rotates about the joint 28. Through this, the upper part 12, which is biased against the cam 26, is pivoted about the joint 16 so that the position of the headrest 20 changes.

The seat and backrest position illustrated at the right in FIG. 1 corresponds to a rear end position of the lower part 14. In this end position the cam 26 is pivoted about the joint 28 in such a manner that the headrest 20 is pivoted forwardly about the joint 16. In the seat and backrest position illustrated at the left in FIG. 1 the cam 26 is pivoted upwardly by the draw cable of the Bowden cable 24 (counterclockwise) about the joint 28 so that the upper part 12 and thus also the headrest 20 is pivoted in the backward direction. Through the Bowden cable 24 thus the upper part 12 can be pivoted in the direction of the front side of the seat by means of an actuation of the hand wheel 18 when the lower part 14 is pivoted in the direction of the rear side of the seat, and vice versa.

As is further shown in FIG. 1, the cam curve 26a is formed in such a manner that the force exerted by the upper part 12 on the cam 26 passes substantially in the direction of the axis of the joint 28, i.e. of the pivot axis of the cam.

Furthermore, it can be recognised in FIG. 1 that an impact plate 30 is arranged at the upper part 12 which extends in the direction of the lower part 14 and which extends approximately parallel to the lower part 14 in a forward seat position. With the help of this impact plate a force can be exerted in the event of a rear collision by the back of the vehicle passenger, which presses into the seat, on the upper part 12 so that the latter is pivoted counterclockwise about the joint 16 and thereby brings the headrest 20 closer to the back of the head of the vehicle passenger.

Figure 2:
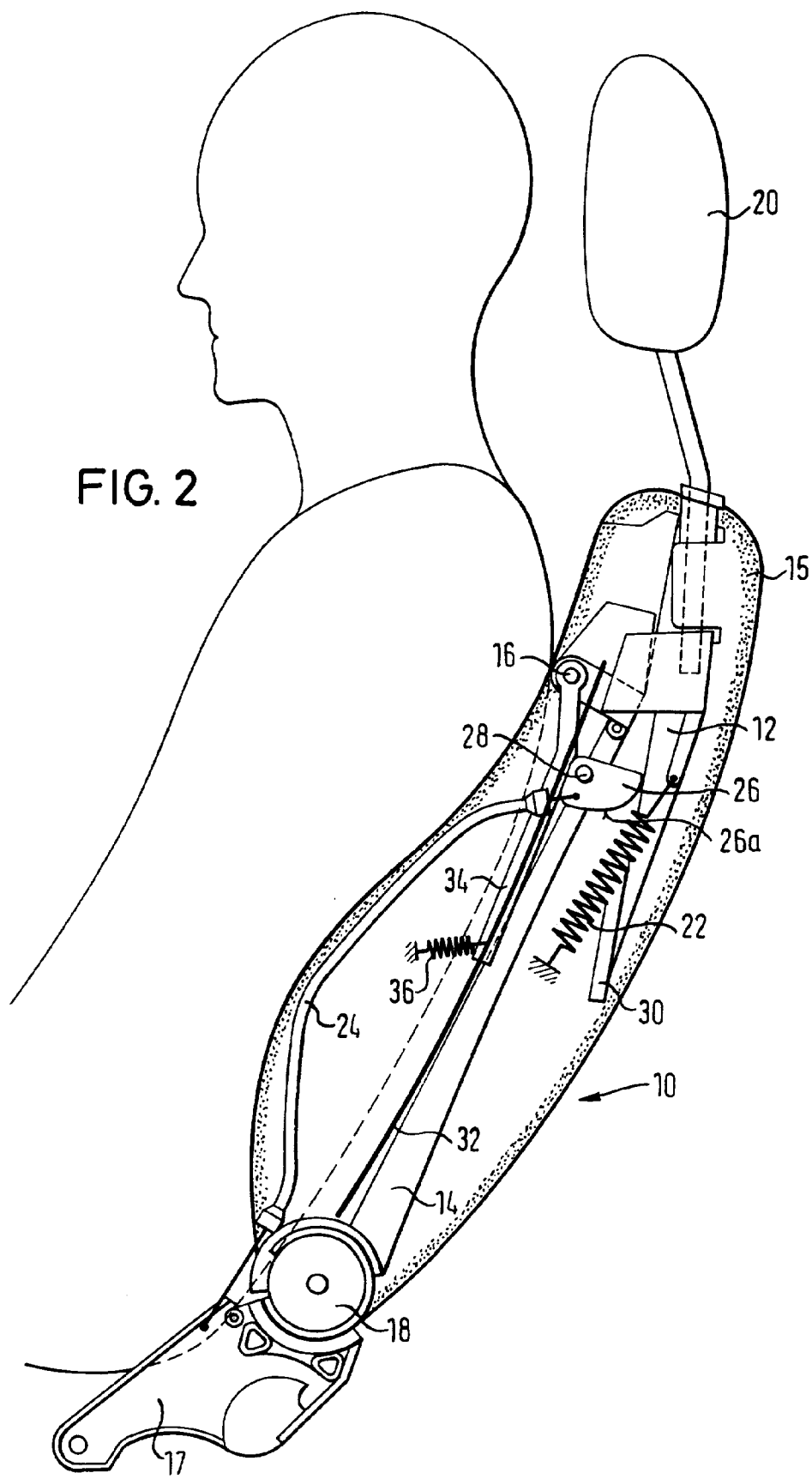
FIG. 2 a partially sectioned side view of a further embodiment, with the vehicle passenger being in the normal seat position.

FIGS. 2 and 3 show a further embodiment of the invention, with similar parts being provided with the same reference symbol. In this FIG. 2 shows a seat position with a reclined backrest frame in normal travel and FIG. 3 the same arrangement in the event of a severe rear collision.

The embodiment of FIGS. 2 and 3 differs from that of FIG. 1 on the one hand in that the draw cable of the Bowden cable 24 is not fastened to the transmission of the hand wheel 18, but rather at the seat frame element 17. An adjustment of the cam 26 takes place also through this when the inclination of the backrest frame is adjusted, and indeed through the relative movement between the lower part 14 and the seat frame element 17.

Furthermore, in this embodiment an impact element in the form of a mat 32 is provided in the lower part 14, which is stretched inside the lower element 14 and which takes up the body of the vehicle passenger (cf. FIG. 3) in a damping manner in the event of a severe rear collision. Moreover, a pivot element 34 which is pivotally connected to the upper end of the lower part 14 and which is biased by a spring 36 relative to the lower part 14 is associated with the upper end of the mat 32.

As shown in FIG. 2, the spring 36 is relieved in normal travel since the back of the vehicle passenger is sufficiently supported by the cushioning 15 of the backrest. In the event of a rear collision the back of the vehicle passenger is pressed into the backrest with a large force so that the mat 32, which is fastened at the side, bends through, through which a force is also exerted on the pivot element 34, which in turn abuts at the impact plate 30 after a pivotal movement against the force of the spring 36 so that a common pivotal movement of the pivot element 34 and the upper part 12 takes place so that the headrest 20 is moved in the direction of the back of the head of the vehicle passenger.

LIST OF REFERENCE NUMERALS 10 backrest frame
12 upper part
14 lower part
15 cushioning
16 joint
17 seat frame element
18 hand wheel
19 transmission
20 headrest
22 spring
24 Bowden cable
26 cam
26a cam curve
28 joint
30 impact plate
32 mat
34 pivot element
36 spring

What is claimed is:

1. A seat and headrest arrangement for a vehicle comprising a backseat frame (10) positioned within a seat trim cover material and having an upper (12) and a lower part (14)

which are pivotally connected to one another via a pivot joint (16), with a headrest (20) being mounted at the upper part (12), wherein a setting device (24) adjusts an inclination of the upper part (12) dependent upon on an inclination of the lower part (14) to thereby pivotally adjust the headrest with respect to the lower part to adjust a distance between the headrest and the head of a seated occupant, and an impact member connected to the upper part and positioned to receive an impact force from the seated occupant in the event of a rear collision of the vehicle, said upper part pivotally connected to the pivot joint intermediate of the headrest and the impact member so that said impact force pivots the upper part about the pivot joint so that the head rest is moved in the direction of the head of the occupant upon impact while the lower part remains stationary.

2. The arrangement in accordance with claim 1, wherein the setting device (24) is mounted with one end at an inclination adjustment (18,19) of the lower part (14).

3. The arrangement in accordance with claim 1, wherein the setting device (24) acts on a cam (26) which is jointly arranged at the lower part (14) and at which the upper part (12) abuts.

4. The arrangement in accordance with claim 3, wherein the upper (12) and the lower part (14) are subjected to a bias force relative to one another; and the cam curve (26a) is formed such that the force which is exerted on the cam (26) by the upper part (12) passes substantially in the direction of the pivot axis (28) of the cam (26).

5. The arrangement in accordance with claim 1, wherein the setting device is at least one Bowden cable (24).

6. The arrangement in accordance with claim 1, wherein the impact member (30) extends in the direction towards the lower part (14).

7. The arrangement in accordance with claim 1, wherein an impact means, which extends along the lower part (12) is provided at the lower part (12).

8. The arrangement with claim 7, wherein a pivot element (34) is associated with the impact means (32) of the lower part and is pivotally connected to the lower part (14) and cooperates with the impact member (30) of the upper part (12).

9. The arrangement in accordance with claim 8, wherein the pivot element (34) is subjected to a bias force relative to the lower part (14) by a spring (36).

10. The arrangement in accordance with claim 1, wherein through the setting device (24), the upper part (12) is pivotal in the direction of the front side of the seat when the lower part (14) is pivoted in the direction of the rear side of the seat.

11. The arrangement in accordance with claim 1, wherein the setting device (24) is mounted with one end at a carrier (17) of the seat.

* * * * *

UNITED STATES PATENT AND TRADEMARK OFFICE
CERTIFICATE OF CORRECTION

PATENT NO. : 6,273,511 B1  
DATED : August 14, 2001  
INVENTOR(S) : Stanislaw Andrzej Wieclawski Page 1 of 1

It is certified that error appears in the above-identified patent and that said Letters Patent is hereby corrected as shown below:

<u>Column 6, claim 8,</u>  
Line 10, after "arrangement" insert -- in accordance --.

Signed and Sealed this

Twelfth Day of March, 2002

Attest:

JAMES E. ROGAN  
*Director of the United States Patent and Trademark Office*

*Attesting Officer*